Dec. 4, 1928.
R. B. LEWIS
1,694,187
TESTING INSTRUMENT
Filed Feb. 20, 1926
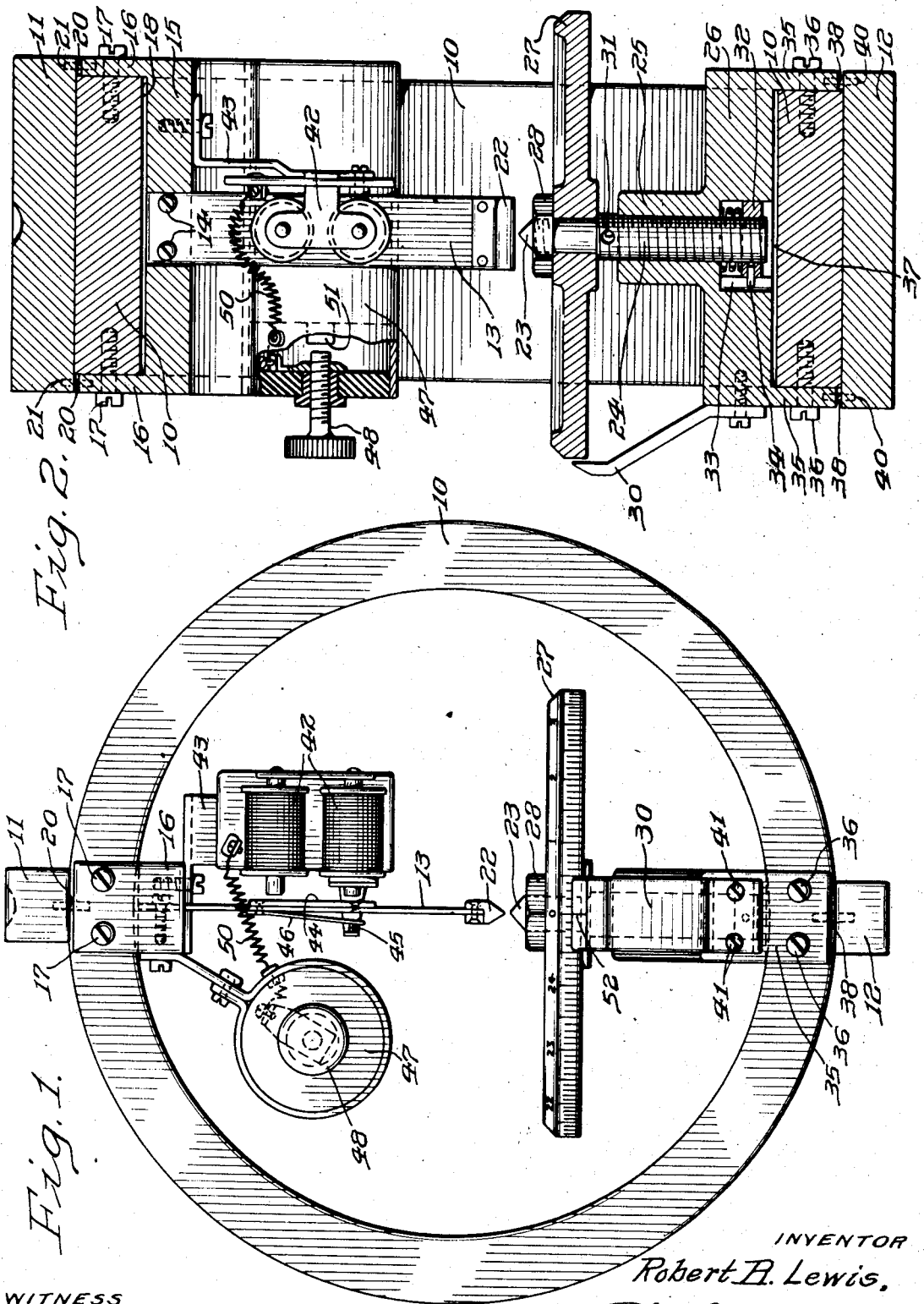
INVENTOR
Robert B. Lewis,
BY Robert M. Barr.
ATTORNEY
WITNESS
F. J. Hartman.

Patented Dec. 4, 1928.

1,694,187

UNITED STATES PATENT OFFICE.

ROBERT B. LEWIS, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

TESTING INSTRUMENT.

Application filed February 20, 1926. Serial No. 89,780.

The present invention relates to force measuring machines and more particularly to a testing instrument for use with such machines.

While force measuring machines have reached a high degree of perfection as regards accuracy and results, there has been, heretofore, no simple and ready means for checking such machines for variations from their calibrated condition to ascertain whether or not errors have crept in due to the generally heavy duty imposed upon machines of this character.

Some of the objects of the present invention are to provide an instrument for easily and exactly testing force measuring machines to determine their accuracy; to provide an improved force measuring instrument of the deflection ring type; to provide means in a testing instrument for indicating the amount of deflection or extension under load; to provide an automatically operated vibratory means for use with elongation and compression measuring instruments; and to provide other improvements as will hereinafter appear.

In the accompanying drawings Fig. 1 represents a side elevation of a testing instrument embodying one form of the present invention; and Fig. 2 represents a sectional elevation of the same.

Referring to the drawings, one form of the present invention comprises a distortable ring 10 formed of any suitable material, but preferably of steel, which is accurately machined for uniform section and carries at diametrically opposite points two bearing blocks 11 and 12 for receiving the pressure of oppositely acting forces.

For the purpose of indicating the amount of deflection or elongation of the ring under load tending to compress or elongate the ring and measuring such distortion in terms of weight, a vibratory member 13, such as a reed, is suspended radially within the ring 10, being supported by screws 14 or any suitable fastening means, from a yoke 15 which spans the width of the ring 10 and has its two arms 16 connected respectively to opposite sides of the ring 10 by screws 17. These screws 17 are threaded into the ring 10 on its neutral axis to avoid errors in the deflection, and for a like reason a clearance 18 is provided between the inner circumference of the ring 10 and the opposed face of the yoke 15. The arms 16 of the yoke 15 are employed to receive dowels 20 which seat respectively in holes 21 of the bearing block 11 and thus ensure the block 11 being correctly positioned.

The free end of the vibratory member 13 terminates in a knife-edged element 22 aligned with the conical end 23 of a micrometer screw spindle 24 which is threaded into a boss 25 of a yoke 26 and has a reduced end portion to receive an operating scale 27, circular in form. The latter is held rigidly in place by a nut 28 threaded on the end of the spindle 24, and may be set to zero position with respect to the index 30 or otherwise adjusted by holding the spindle 24 against movement while loosening the nut 28. A hole 31 in the spindle 24 forms a convenient means for inserting a suitable implement for so holding the spindle. A spring pressed nut 32 on the spindle 24 holds the parts firmly for proper operation and a keyway 33 and key 34 provide for linear movement of the nut 32 but prevent its rotation. The yoke 26 spans the width of the ring 10 diametrically opposite to the yoke 15 and its arms 35 are fastened in the neutral axis of the ring 10 by screws 36, but with provision for a clearance 37 between the two parts. Also the arms 35 provide supports for dowels 38 which seat in holes 40 of the bearing block 12 and ensure true placement of the latter. The index 30 is rigidly held by screws 41 threaded into the yoke 26.

In order to cause the reed 13 to vibrate, a pair of electro-magnets 42 are supported by a bracket 43 from the yoke 15 so that their poles are in operative relation to an armature 44 fixed to the reed 13. A contact 45 is carried by the grounded frame of the magnets 42 and coacts with a make-and-break strip 46 fixed to the reed 13. Current for energizing the magnets 42 is supplied, in the present instance, by a dry battery 47, one terminal of which is a movable thumb screw 48 which connects by a conductor 50 with the magnets 42, and the other terminal of which is the fixed pole 51 of the battery 47. The battery 47 is supported from the yoke 15 by a clamp strap 52 or any other suitable means.

In the operation of the instrument, the micrometer is first set to zero, this being done by turning its spindle 24 until the end 23 touches the end 22 of the vibratory element 13, and then holding the spindle 24 fixed, (by inserting an implement in the hole 31) while loosening the nut 28. The scale 27 can then be set so that its zero graduation is opposite the index 52 of the pointer 30, and when so set the nut 28 is tightened. When a compressive force is to be applied, the spindle 24 is turned to back off the end 23 from the end 22 to allow clearance for the movement of the end 22 caused by the distortion of the ring 10. Assuming now that a force is applied to the bearing block 11 so that it acts toward the center of the ring while the reacting force is applied through the bearing block 12 which rests upon a fixed base, the ring 10 will be under compression. The compressive effect of the applied force is to cause a deflection of the ring 10 directly proportional to the amount of applied force. In order to measure the amount of deflection, the circuit of battery 47 is closed by moving the thumb screw 48 into contact with the terminal 51 and as a result the magnets 42 are energized and the make-and-break 45 and 46 causes the vibratory member 13 to oscillate at a uniform amplitude. With the member 13 in continuous oscillation, the micrometer spindle is turned in a direction to feed the end 23 toward the end 22 of the member 13 and when it contacts therewith an audible change of pitch or musical tone of the reed immediately occurs and thereby indicates that there is contact established between the two meeting ends. The reading on the scale 27 is then taken and the number of degrees or variation from the zero position is representative of the applied force which has caused this particular deflection. For example, if the present instrument is used to test for accuracy a force measuring machine then this instrument will indicate, for example, by a deflection of one ten-thousandths of an inch that the applied force amounts to seventeen pounds, thus in the calibration of weighing machines with the present instrument for each weight of seventeen pounds applied to the ring 10 there should result a deflection of one ten-thousandths of an inch. In this way force testing machines can be accurately tested at any time to determine whether or not they are giving correct results and the test is not only simple and accurate but can be made by those ordinarily unskilled in the testing of such force machines.

By the provision of a vibratory element which is continuously vibrated with a uniform amplitude, a very exact and definite way of locating the point of contact between the two opposed points is obtained and a very sensitive means of determining the amount of deflection results.

It will now be apparent that a complete unitary testing instrument has been provided wherein measurement of the distortion of a body is proportionate to the external force applied to the body and takes place through the medium of a vibratory element oscillating with constant amplitude. Furthermore while as here shown, the instrument is internally applied to a ring capable of deflection or elongation according to the direction of the applied force, it may be used in a variety of ways for measuring distortion and it is to be understood that the invention is not limited to the illustrative use shown.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A testing instrument comprising a ring, a vibratory element suspended internally of said ring, an adjustable contact mounted in said ring opposite to and aligned with said element, and electrically operated means for vibrating said element whereby touching of said element by said contact is audible and indicates a distortion of said ring proportional to the amount of the external force.

2. A testing instrument comprising a ring, a vibratory element suspended internally of said ring, a micrometer mounted in said ring and having an end aligned with said element, said end being movable towards and away from said element, and electrically operated means for vibrating said element to cause a changed tone when said end contacts with said element, whereby the deflection of said ring is determined under load.

3. A testing instrument comprising a distortable member, a vibratory element connected to one part of said member, an adjustable contact attached to another part of said member opposite to and aligned with said vibratory element but disconnected therefrom, and electrically operated means for vibrating said element whereby the touching position of said contact with said element is determined.

4. A testing instrument comprising a ring, a vibratory element associated with said ring, means to cause said element to oscillate with constant amplitude, an adjustable measuring device arranged to be brought into contact with said vibrating element to indicate by a change of pitch of said element when a contact is established, and a scale on said device for indicating the variation of said device from one position to contact position.

Signed at Philadelphia, county of Philadelphia, State of Pennsylvania, this 10th day of February, 1926.

ROBERT B. LEWIS.